(12) United States Patent
Koren et al.

(10) Patent No.: US 11,677,673 B1
(45) Date of Patent: Jun. 13, 2023

(54) LOW LATENCY FLOW CONTROL IN DATA CENTERS

(71) Applicant: XSIGHT LABS LTD., Kiryat Gat (IL)

(72) Inventors: Guy Koren, Rishon Lezion (IL); Gal Malach, Gedera (IL); Erez Shaizaf, Nir Chen (IL)

(73) Assignee: XSIGHT LABS LTD., Kiryat Gat (IL)

( * ) Notice: Subject to any disclaimer, the term of this patent is extended or adjusted under 35 U.S.C. 154(b) by 0 days.

(21) Appl. No.: 17/446,982

(22) Filed: Sep. 6, 2021

Related U.S. Application Data

(63) Continuation of application No. 16/578,344, filed on Sep. 22, 2019, now Pat. No. 11,115,341.

(60) Provisional application No. 62/747,172, filed on Oct. 18, 2018, provisional application No. 62/747,163, filed on Oct. 18, 2018.

(51) Int. Cl.
*H04L 47/30* (2022.01)
*H04L 47/2483* (2022.01)
*H04L 45/122* (2022.01)
*H04L 47/12* (2022.01)
*H04L 47/10* (2022.01)
*H04L 47/22* (2022.01)

(52) U.S. Cl.
CPC ............ *H04L 47/30* (2013.01); *H04L 45/122* (2013.01); *H04L 47/12* (2013.01); *H04L 47/15* (2013.01); *H04L 47/22* (2013.01); *H04L 47/2483* (2013.01)

(58) Field of Classification Search
CPC ......... H04L 47/30; H04L 47/12; H04L 47/22; H04L 47/2483; H04L 45/122; H04L 47/15
See application file for complete search history.

(56) References Cited

U.S. PATENT DOCUMENTS

2020/0092228 A1* 3/2020 Cai .................. H04L 49/351
2020/0169513 A1* 5/2020 Goel ................. H04L 47/34

* cited by examiner

*Primary Examiner* — Jung H Park
(74) *Attorney, Agent, or Firm* — Reches Patents

(57) ABSTRACT

A system for managing traffic between servers, the system may include first tier switches that are coupled to the servers; second tier switches that are coupled to the first tier switches and to third tier switches; and controllers. Wherein each first tier switch comprises first queues. Wherein each second tier switch comprises second queues. The controllers are configured to control a traffic between the first tier switches and the second tier switches attributed to the traffic between the servers, (a) on, at least, a queue granularity; (b) while controlling some first queues to provide buffer extension to some second queues, and (c) while controlling some second queues to provide buffer extension to some first queues.

5 Claims, 9 Drawing Sheets

300

LOW LATENCY FLOW CONTROL IN DATA CENTERS

CROSS-REFERENCE

This application claims priority from U.S. provisional patent 62/747,163 filing date Oct. 18, 2019 and from U.S. provisional patent 62/747,172 filing date Oct. 18, 2019, both being incorporated herein by reference.

BACKGROUND

A data center is a pool of resources including compute, storage and variety accelerators which are connected together using a dedicated network. The data center network plays a major role within the datacenter efficiency and scalability since it requires to connect hundreds of thousands of servers that are constantly communicate with each other. The emerging trend of datacenter disaggregation where servers are separated into their constituent compute, memory and storage elements puts even higher demands on the network stability, reliability and performance. This allows sharing of resources across the datacenter in order to support variety of workloads.

Today, servers are the basic building block of the IT infrastructure, but a single workload cannot use more memory, CPU or storage than are available in a single server nor can servers share available resources outside their physical box.

Considering the fact that workloads have a big disproportionality in their resource allocation, some are CPU hungry but not use much memory while others use four orders of magnitude more memory than CPU, enables large amount of resource sharing while achieving better utilization of the datacenter infrastructure.

An incast is a communication pattern where a receiver (server) initiates data requests to multiple senders (servers). The senders, upon receiving the request, respond concurrently and transmit a large amount of data to the receiver to provide a microburst. The data from all senders creates a bottleneck link (many-to-one).

There have been many solutions proposed for incast. Representative approaches include modifying TCP parameters or its congestion control algorithm, optimizing application level data transfer patterns, switch level modifications such as larger buffers or explicit congestion notification (ECN) capabilities, and link layer mechanisms such as Ethernet congestion control. However, due to the dynamic patterns of datacenter traffic, emerging new types of applications and the nature of an incast which is temporary yet significant, resource consumer the challenge of handling incasts still remains. A brute-force approach which targets larger switch buffer is definitely not the answer and may lead to a buffer bloat and large latencies.

It has been found that bursts such as microbursts (bursts that are shorter than 1 milliseconds) are not managed in an efficient manner in datacenters and that the load imposed by the microbursts is not balanced properly.

There is a growing need to perform a fast and efficient traffic management solution. The solution may efficiently manage microbursts.

SUMMARY

System, method and computer readable medium as illustrated in the specification and/or the claims and/or the drawings.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
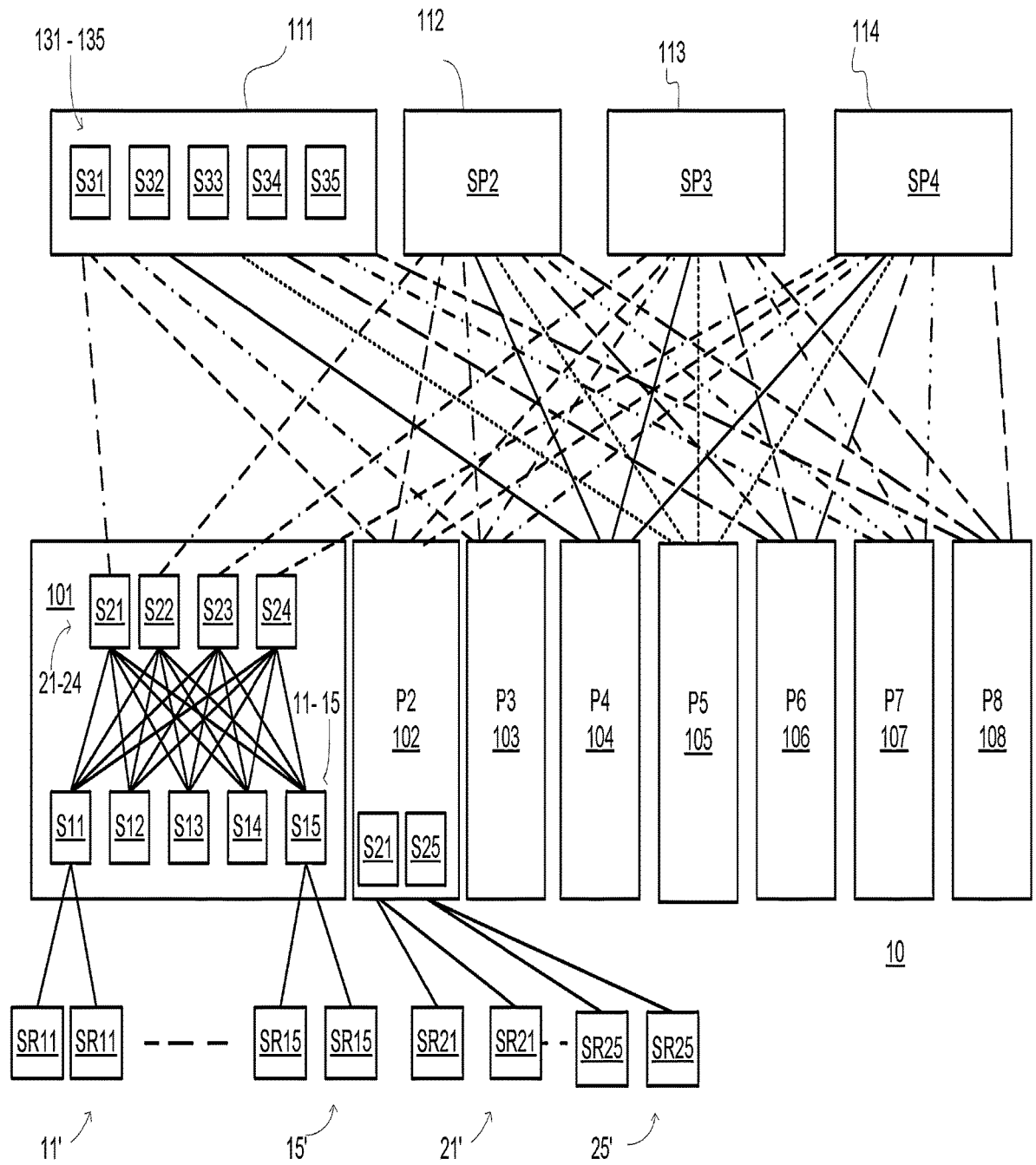
FIG. 1 is an example of servers and a system.

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

Any reference to a "solution" should be applied mutatis mutandis, to a method, system, and a non-transitory computer readable medium as illustrated below.

The term "and/or" is additionally or alternatively.

In the following description and related drawings there may be provided various numerical examples (for example eight pods, five first tier switches per pod, four second tier switches per pod, four third tier switches, five third tier switches per third tier switch)—but any other numbers may be provided.

The terms "buffer" and "queue" are used in an interchangeable manner.

The terms "system", "unit", "device" are used in an interchangeable manner.

Buffer extension queues are queues that provide buffer extension to another buffer. They are also referred to as virtual queues.

The terms "first tier" and "leaf" are used in an interchangeable manner.

There may be provided a peer-to-peer flow control protocol (hereinafter—protocol), systems for implementing the protocol, and/or methods of using the protocol that may exhibit the following:
  a. Support buffer extension among network nodes.
  b. HoL (Head of the Line) Blocking prevention.
  c. Be implemented by a very short control loop.
  d. Support a smart triggering by applying both switch resources and incast packet rate.
  e. Auto recovery mechanism that increase the rate according to predefine steps the move from one rate to another is also programmable. This has a significant impact since it allows the system to recover fast and eliminate the need in another message.

The auto recovery includes sensing that the rate of traffic (from a queue, from a group of queues, from a port, from a link) can be increased (after being reduced)—and starting the recovery—even without receiving any feedback from the servers or any other entity.

The recovery may be gradual—it may include multiple iterations of rate increments—instead of immediately increasing the traffic rate to a maximal rate. Different traffic managers may apply different auto-recovery processes. For example—the rate of traffic rate increment may differ from one traffic manager to another, the manner in which the traffic is increased (linear, non-linear, exponential, and the like) may differ from one traffic manager to another, the timing of rate change decisions and/or of the sampling of the state of the queues may differ from one traffic manager to the other.

Buffer extension means that traffic experiencing congestion in a network node (such as a switch) is first buffered in that node. When this buffer is exhausted (or even before the buffer is exhausted), this traffic can be buffered in the node's upstream peers.

For example—a queue of a first tier switch may be associated with buffers of a second tier switch (that may be referred to as second tier buffer extensions queues).

Yet for another example—a queue of a second tier switch may be associated with buffers of a first tier switch (that may be referred to as first tier buffer extensions queues).

HoL Blocking prevention means that traffic not subject to congestion continues to flow in the network and is not delayed by traffic experiencing congestion and delays. In a sense the HoL blocking prevention may be achieved, at least in part, by applying a queue granularity control of traffic.

Having a short control loop, allows quick reaction to workload changes in the network—that can efficiently manage micro-bursts. This may allow to optimize the node buffering resources, increasing link utilization and shortening delays. The short control loop may refer to the control of the traffic in the first and second tiers—for example—based (at least mainly if not exclusively) on the state of first and/or second tier queues. For example—the short control loop may not be based on end-to-end feedback—and may not wait to receive feedback from source and/or destination servers.

The suggested solution may exhibit microsecond scale response times—and may efficiently manage microsecond scale microbursts.

Accordingly—the suggested solution may be well adapted to manage bursts such as but not limited to microbursts.

The suggested solution may provide minimize FCT (Flow Completion Time) even in heavy incast workloads.

The buffer extension reduces drop probability of incast traffic and prevents (or at least greatly reduces) the retransmission delay associated with it.

HoL blocking prevention, reduces delays induced by congested flows on uncongested flows.

The short control loop, allows quick identification of an occurrence of incasts events and appropriate response.

Comparing to standard Ethernet flow control protocols (802.3x LLFC and 802.1Qbb PFC), the suggested solution is unique in providing all three capabilities concurrently.

Figure 2:
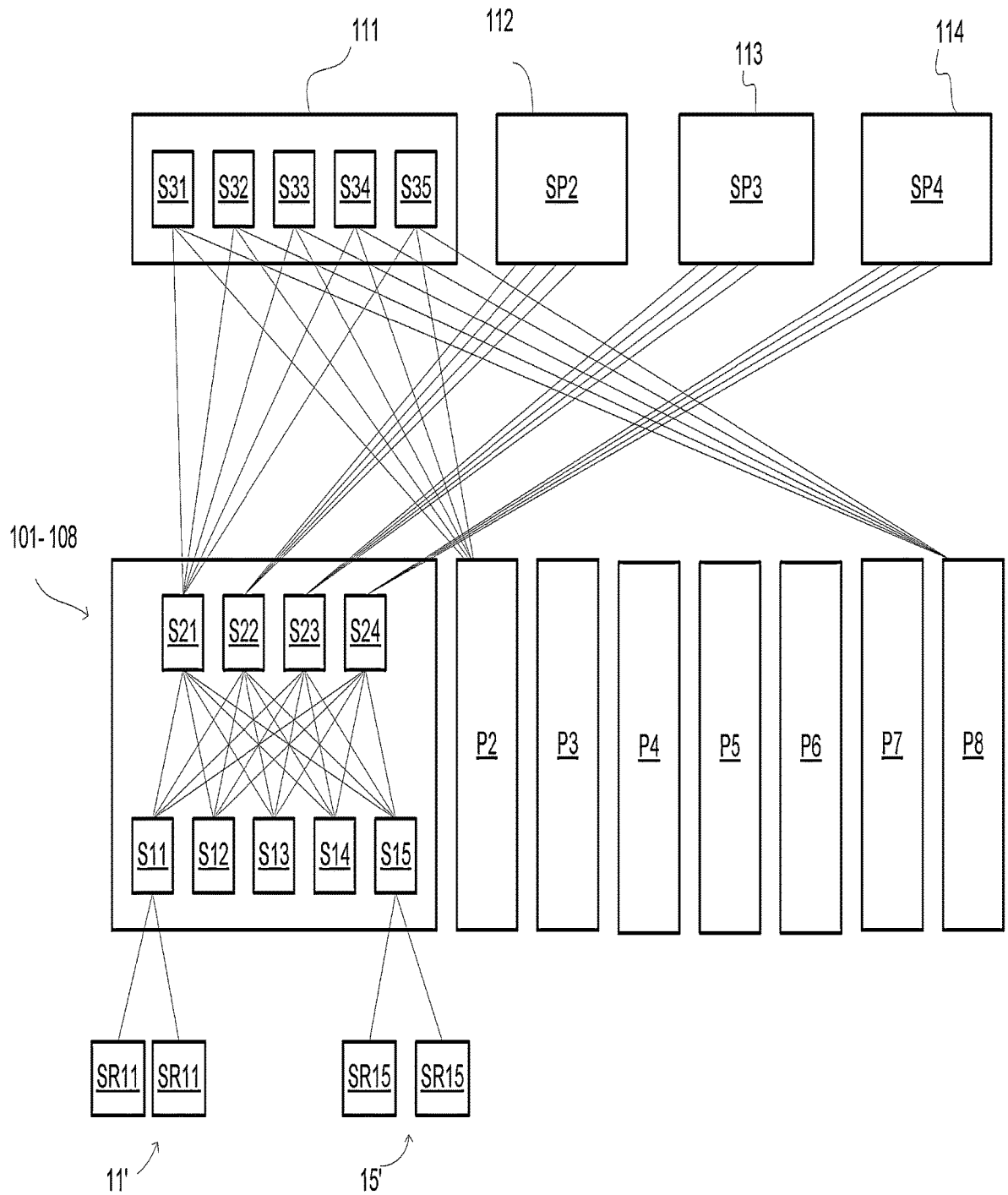
FIG. 2 is an example of servers and a system.

FIGS. 1 and 2 illustrate servers and a system 10.

System 10 may be a data center, may be a part of a datacenter, and the like.

Multiple groups of servers are coupled to multiple first tier (T1) switches that are arranged in multiple pods (P1 101-P8 108). Each pod includes T1 switches and second tier (T2) switches. The T2 switches are coupled to third tier (T3) switches.

For example—first pod 101 is illustrated as including T1 switches S11-S15 11-15 that are coupled to T2 switches S21-S24 21-24.

FIG. 1 illustrates various groups of servers such as group of servers SR11 11' that are coupled to T1 switch S11, group of servers SR15 15' that are coupled to T1 switch S15, group of servers SR21 21' that are coupled to a T1 switch S21 121 of pod 2, and a group of servers SR25 25' that are coupled to a T1 switch S25 125 of pod 2.

The protocol may be implemented on downstream direction (towards the servers) and/or on upstream direction (from the servers).

In the downstream direction, congestion in a T1 switch enjoys buffer extension in one or more T2 switches. In the upstream direction, congestion in a T2 switch enjoys buffer extension in one or more T1 switches. Each switch includes one or more queues—and may include multiple queue groups.

The system may apply a minimum hop approach.

For example—a packet starting at a source server goes in the upstream direction only the minimum number of levels required to reach its destination within the system. Then it takes a single downstream path to the destination server. Packets do not perform unnecessary "zig-zags" that include, for example three or more changes of direction—such as upstream-downstream-upstream movement.

For example:

a. The system may allow traffic between servers coupled to a same T1 switch to flow without reaching any T2 switch. This traffic may be referred to as intra-leaf traffic.

b. The system may allow traffic between servers coupled to different T1 switches of a same pod without reaching any T3 switches. This traffic may be referred to as inter-leaf traffic.

c. The system may pass traffic between servers coupled to different pods at an upstream direction through T1, T2 and T3 switches—and then at a downstream direction through T3, T2 and T1 switches. This traffic may be referred to as intra-pod traffic.

It should also be noted that traffic between different tiers of the system may be routed along paths that may be determined based on various parameters such as the connection (for example, port, switch and pod) between each one of the source server and the destination server and/or may also be responsive to load balancing considerations (for example—load balancing between T3 switches).

Figure 3:
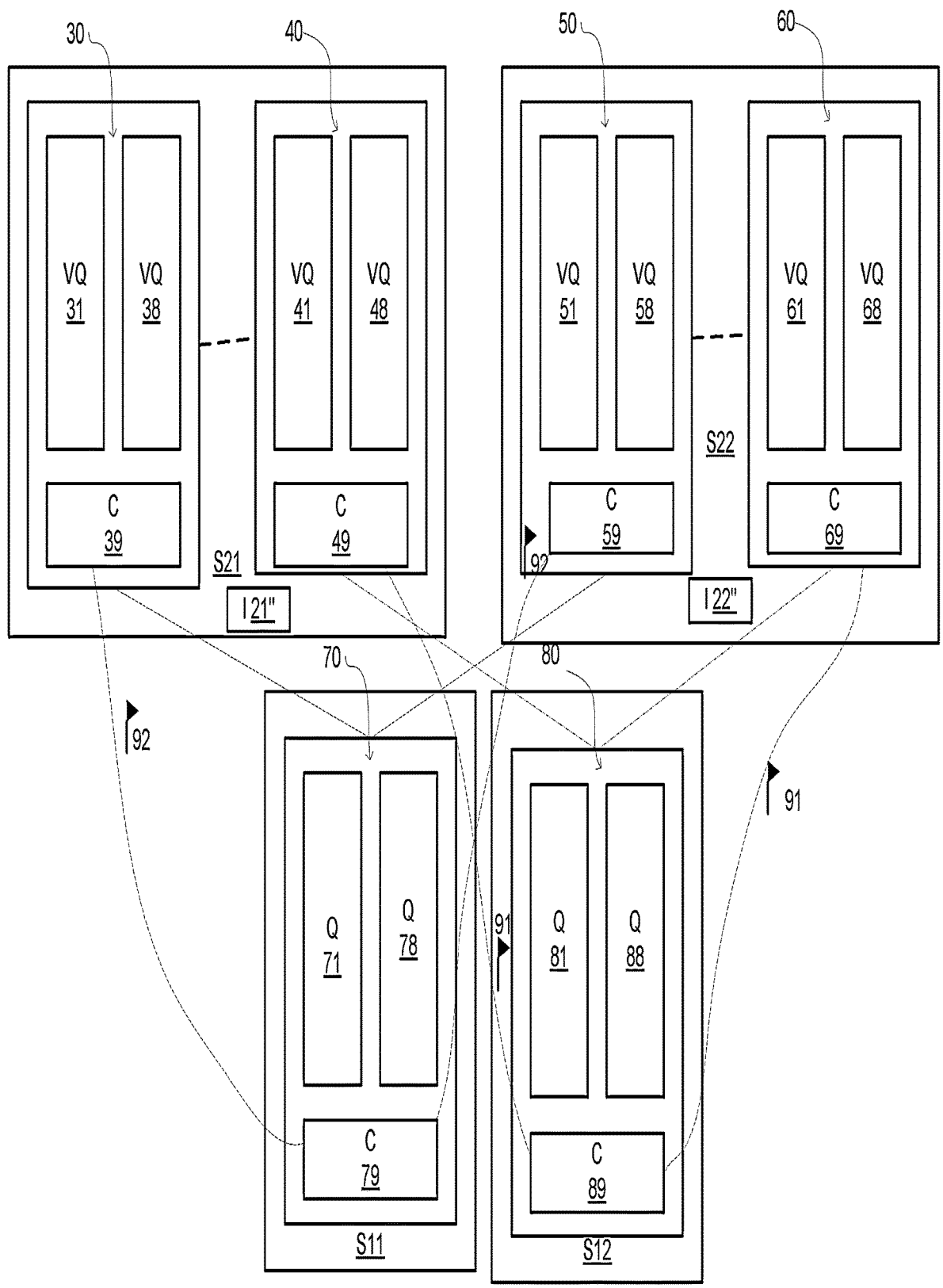
FIG. 3 is an example of various parts of the system.

FIG. 3 illustrates T1 switches S11 11 and S12 12 and two T2 switches S21 21 and S22 22.

Each switch includes an interface (such as interface 21' of S21 and interface 22' of switch 21'). The interfaces may receive traffic and/or alerts, may send the traffic and/or the alerts to their destination (queue, controller, and the like) within the switch, and the like.

Any controller illustrated in any of the figures may be included within an interface or outside the interface.

If an upstream switch is connects to multiple downstream switches then the upstream switch holds virtual queues for every queue in the downstream switches. Every virtual queue may be is dynamically rate shaped by the frames—for example with maximum rate that exceeds the rate of the queue. It should be noted that the rate limiting should reflect the actual port rate (the egress port at T1) and the current congestion.

In FIG. 3 the traffic is at the upstream direction and the T2 switch is the upstream switch while the T1 switch is the downstream switch.

A group 70 of T1 queues 71-78 (of S11 11) receives buffer extension by a group 30 of T2 queues 31-38 (of S21 21) and by a group 50 of T2 queues (of S22 22) 51-58.

A group 80 of T1 queues 81-88 (of S11 11) receives buffer extension by a group 40 of T2 queues 41-48 (of S21 21) and by a group 60 of T2 queues (of S22 22) 61-68.

Controller C 39 controls group 30 of T2 queues 31-38.
Controller C 49 controls group 40 of T2 queues 41-48.
Controller C 59 controls group 50 of T2 queues 51-58.
Controller C 69 controls group 60 of T2 queues 61-68.
Controller C 79 controls group 70 of T1 queues 71-78.
Controller C 89 controls group 80 of T1 queues 81-88.

In FIG. 3, controller C 89 detects (for example—based on internal resources of the switch and incoming rate) a potential congestion of queue 84 (or any other queue of queues 81-88) and sends a potential congestion alert 91 to controller C 49 and to controller C 69. The potential congestion alert may be issued (based on the rate of the ingress traffic and the fullness of the available queues) before the actual congestion—or when the congestion occurs. The former is usually preferable over the latter.

Either one of controller C 49 and controller C 69 may perform a congestion reduction operation—especially buffer expansion and requesting upstream entity to reduce transmission rate, and the like. The operation may be performed in a queue granularity—affecting traffic related to the T2 queues associated with queue 84.

FIG. 3 also illustrates controller C 79 as detecting a potential congestion of queue 72 (or any other queue of queues 71-78) and sends a potential congestion alert 92 to controller C 39 and to controller C 59. The potential congestion alert may be issued before the actual congestion—or when the congestion occurs. The former is usually preferable over the latter.

Either one of controller C 39 and controller C 59 may perform a congestion reduction operation—such as rate limiting. The operation may be performed in a queue granularity—affecting traffic related to the T2 queues associated with queue 72.

The potential congestion alert 91 may be a control frame or may have any other format. For example—the potential congestion alert may be piggy bagged on a message.

The potential congestion alert may include only an indication about the potential congestion but may include additional information such as queue identifier, alert identifier, any measure of the severity of the potential congestion, level of queue, and the like.

The potential congestion alert may be broadcasted to all upstream switches or may be sent to a specific upstream switches.

If an upstream switch connects to a downstream switch over a single link then virtual queues associated with that link may support exactly the number of queues in the downstream switch. However, if an upstream switch connects to a downstream switch over multiple links, then the virtual queues associated with a single link may support either all or just a subset of downstream switch queues.

The minimum scale of virtual queues is achieved when each queue may receive traffic from only one of the links. The maximum scale of virtual queues is achieved when every queue receive traffic from all the links. In the second case the same set of virtual queues is instantiated once per link.

The switch may support a hybrid mode, where the number of virtual queue groups (or virtual queue instances) is less than the number of links.

Figure 4:
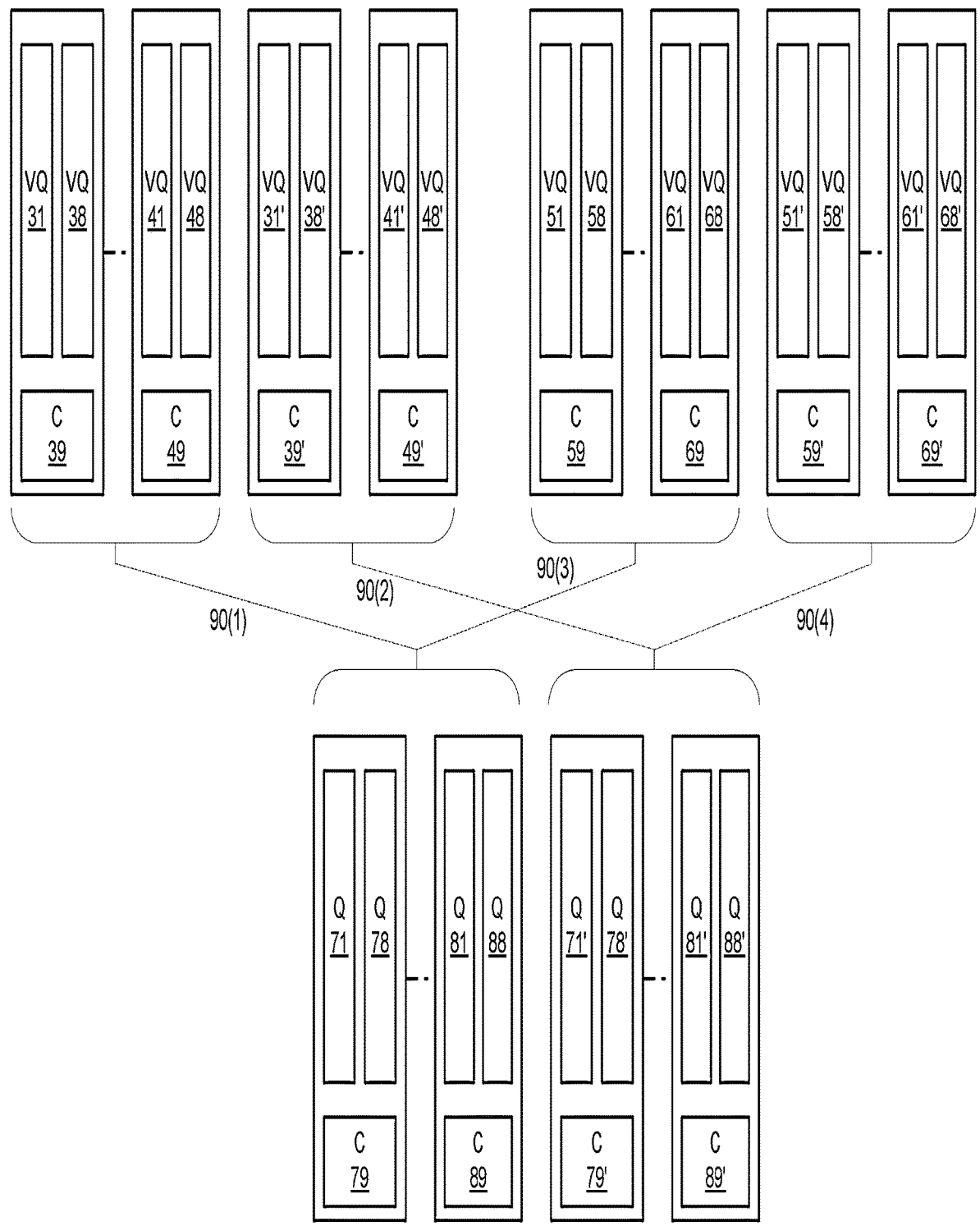
FIG. 4 is an example of various parts of the system.

FIG. 4 illustrates one T1 switch and one T2 switches that are connected by four links 90(1), 90(2), 90(3) and 90(4). Each couple of links serves all queues, but every link serves only half of the queues.

For example:
a. Link 90(1) serves T1 queues 71-78 and 81-88, T2 virtual queues 31-38 and T2 virtual queues 41-48.
b. Link 90(2) serves T1 queues 71'-78' and 81'-88', T2 virtual queues 31'-38' and T2 virtual queues 41'-48'.
c. Link 90(3) serves T1 queues 71-78 and 81-88, T2 virtual queues 51-58 and T2 virtual queues 61-68.
d. Link 90(4) serves T1 queues 71'-78' and 81'-88', T2 virtual queues 51'-58' and T2 virtual queues 61'-68'.

It should be noted that the virtual queues are flexible enough to tradeoff between load balancing efficiency and virtual queue scale in the upstream switch. In addition, the system may support multiple virtual queues of multiple priority levels—for example—a T1 device may be provided where half of its 256 ports are facing the servers and the other half are connected to T2 switches. For each LINK the system maintains 1K queues in T2 which reflects 8 priorities×128 (T1 ports towards the servers)

In the event that the upstream switch has multiple instances of virtual queues (say, one instance per link), each instance of virtual queues may be independently rate controlled by the downstream switch. This may generate large oversubscription ratio and excessive requirement for buffering in the downstream switch, even when the number of upstream switches is small.

To control the overall oversubscription generated by a single upstream switch, the upstream switch may incorporate rate estimators that measure the aggregated rate of multiple virtual queues and a controller that may rate control the entire switch and/or an entire port of the switch (whereas a port is connected to a link).

A single switch may load a queue with a rate equal to (or exceed) the rate (with little speedup).

The controllers of the system may control the queues—for example may control the rate of traffic related to one or more queue in various granularities—such as single queue granularity, group of queues granularity, link granularity and switch granularity.

The rate control may determine the rate of traffic from a queue or to the queue based on various considerations such as the state (for example fullness) of one or more queue, priorities, rate of traffic and the like.

The rate control may impose limitations (or policies) related to a traffic associated with a single queue, to a traffic related to a group of queues, to a traffic related to a link or a port and even to a traffic related to an entire switch.

For example—the overall traffic from queues linked to a certain link should not dramatically exceed the maximal rate supported by the link.

The system may maintain a little speedup in order to allow the downstream switch to be oversubscribed. This oversubscription may better utilize the buffers of the downstream switch, and (2) assist in attempting to guarantee one or more requested quality of service (QoS). QoS may be guaranteed by oversubscribing the downstream switch and letting the system to throttle individual queues.

The switch may include controllers that may be allocated various tasks (including rate control tasks). For example—some controllers may perform queue-granularity based rate control while other controllers may perform link-granularity rate control. Other allocation of rate control schemes and controllers may be provided. A controller may apply one or more rate control schemes of one or more granularities.

Figure 5:
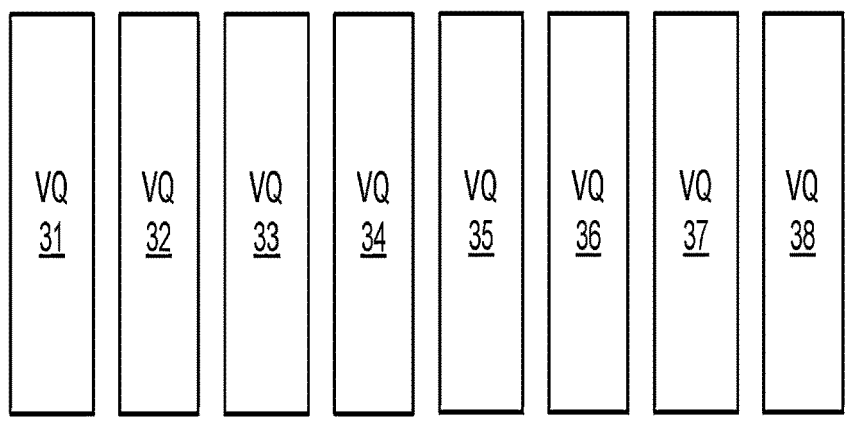
FIG. 5 is an example of various parts of the system.
Figure 5:
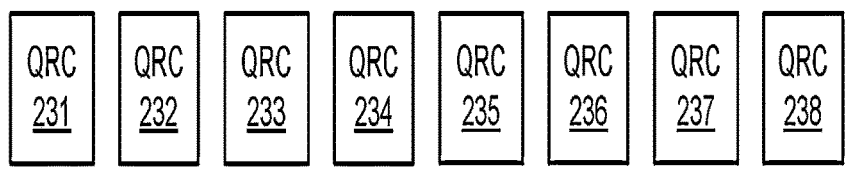
Figure 5:
Figure 5:
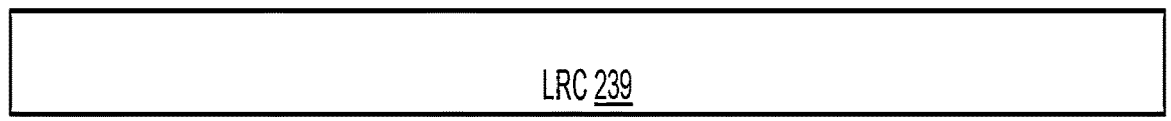
Figure 5:

FIG. 5 illustrates virtual queues 31-38, queue rate controllers QRC 231-238 (each QRC is allocated to a single virtual queue and perform queue-granularity rate control), and coarser rate controllers such as (a) queue group rate controller QGRC 230 that performs group of queue granularity rate control, (b) link rate controller LRC 239 that performs link granularity rate control, and (c) switch rate controller SRC 239' that performs switch granularity rate control.

The queues may be preceded, followed or included within interfaces such as port interface and/or I/O interfaces.

Figure 6:
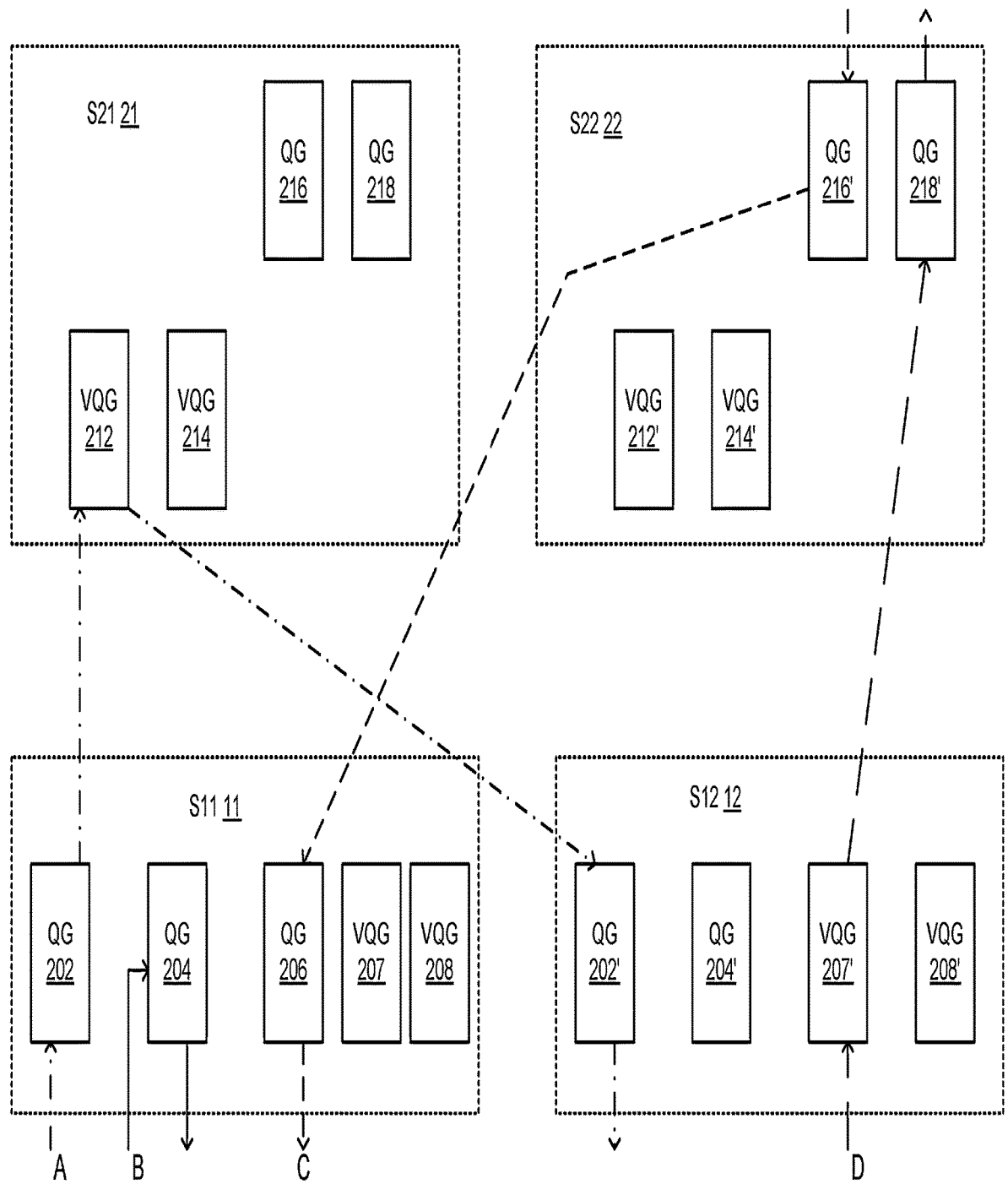
FIG. 6 is an example of various parts of the system.

FIG. 6 illustrates various switch and different paths within a pod.

FIG. 6 illustrates various groups of queues of S11 11, S12 12, S21 21 and S22 22.

Symbol A represents an inter-leaf traffic—traffic from a source server (of group of servers 11' of FIG. 1) is sent to a T1 queue of T1 queue group QG 202, sent to a T2 virtual queue of T2 virtual queue group VGQ 212, sent to a T1 queue of T1 queue group QG 202' and then sent to a destination server of group of servers 12' of FIG. 1).

Symbol B represents intra-leaf traffic—traffic from a source server (of group of servers 11' of FIG. 1) is sent to a T1 queue of T1 queue group QG 204, and then sent to a destination server (also of group of servers 11' of FIG. 1). The different servers may be coupled to the T1 switch by one or more links.

Symbol C represents a downstream part of an inter-pod traffic—traffic from a T3 switch is sent to a T2 queue of T2 queue group VQG 214', sent to a T1 queue of T1 queue group QG 206 and then sent to a destination server (of group of servers 11' of FIG. 1).

Symbol D represents an upstream part of an inter-pod traffic—traffic a from a source server (of group of servers 11' of FIG. 1) is sent to a T1 virtual queue of T1 queue group VQG 207', sent to T2 queue of T2 queue group QG 218' and sent to a T3 switch (not shown).

It should be noted that the queues allocated for different types of traffic (inter-leaf, intra-leaf and inter-pod) may differ from each other. The allocation of queues to traffic types may be fixed or may change from time to time.

The system may apply one or more load balancing schemes for distributing traffic between various queues. For example—load balancing may be applied when sending traffic from queues of different tiers. For example—a load balancing scheme may be applied for determining which T3 switch receives traffic from a T2 switch.

Figure 7:
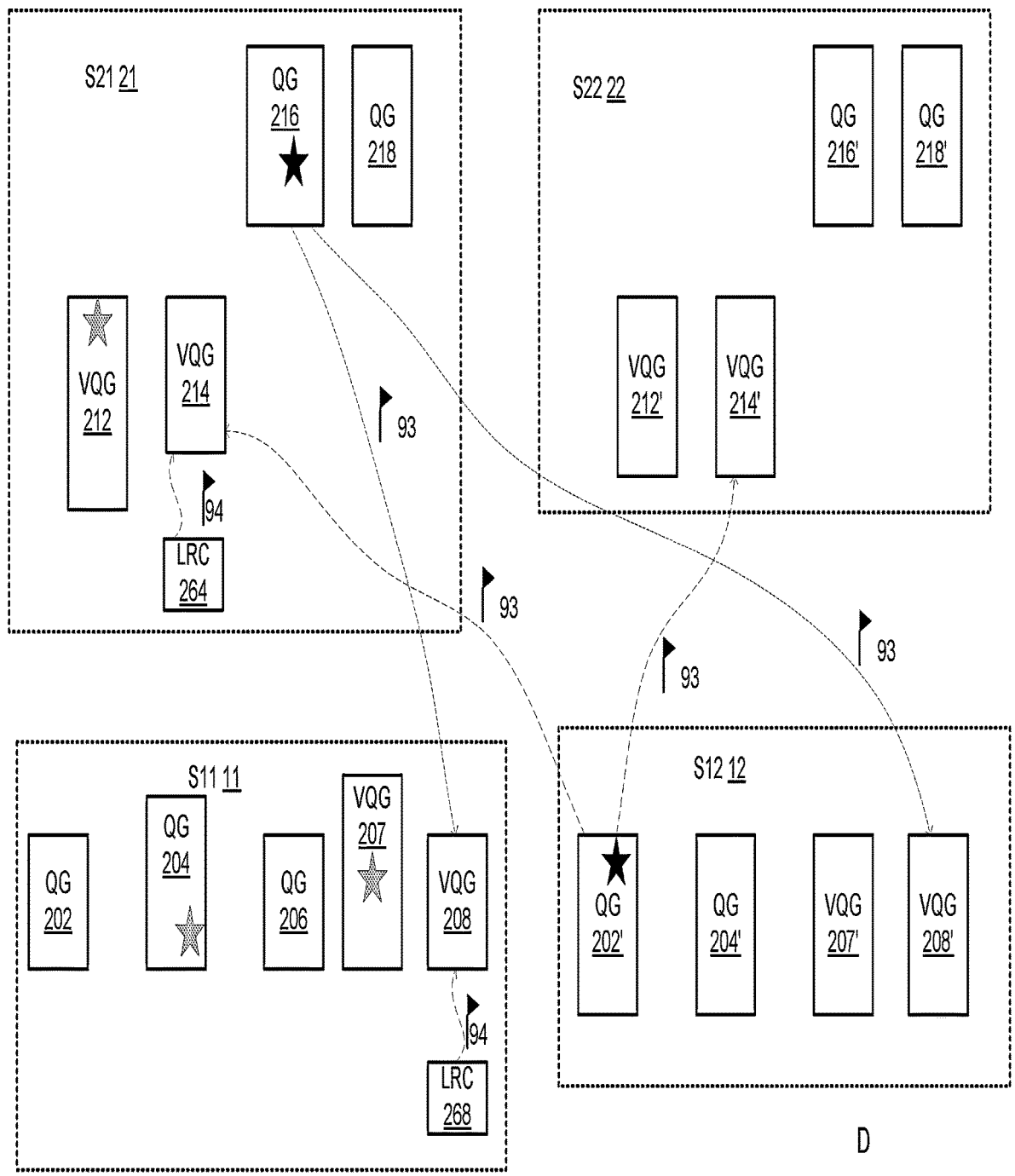
FIG. 7 is an example of various parts of the system.

FIG. 7 illustrates various potential congestion events and various types of responses for managing the potential congestion events.

Queue level potential congestion events (represented by a black star) within T2 group of queues 216 result in sending potential congestion alerts 93 to T1 group of virtual queues 208 and 208' that provide buffer extension to T2 group of queues 216.

Queue level potential congestion events (represented by a black star) within T1 group of queues 202' result in sending potential congestion alerts 93 to T2 group of virtual queues 214 and 214' that provide buffer extension to T1 group of queues 202'.

Queue level potential congestion events in groups of queues that do not have a buffer extension support of themselves—will not trigger the sending of potential congestion alerts 93—and may be managed locally—for example by dropping packets, or applying any other local traffic shaping algorithm (such as AQM) or PFC for lossless traffic.

This is illustrated by potential congestion events (gray star) in T2 virtual group of queues VQG 212, in T1 virtual group of queues VQG 207, and in a group of queues allocated for intra-leaf traffic such as T1 group of queues 204. The same may be applied to queues that are allocated for inter-leaf traffic.

FIG. 7 also illustrated that a coarser granularity potential congestion alert 94 may be generated by a rate controller in view of the overall traffic over a link and/or towards a certain group of queues. In FIG. 7, link rate controller 268 sends potential congestion alert 94 to T1 virtual group of queues VQG 208. In addition—link rate controller 264 sends potential congestion alert 94 to T2 virtual group of queues VQG 204.

It should be noted that any of the rate controller may or may not apply any rate control policy—such as priority-based flow control (PFC) that may including blocking traffic from a certain queue, blocking traffic from a certain group of queues, blocking traffic from a certain port or link or switch, blocking traffic of certain priority from a certain queue, blocking traffic of certain priority from a certain group of queues, blocking traffic of certain priority from a certain port or link or switch, and the like.

The PFC may be less efficient that the mentioned above potential congestion prevention measures—but may be supported by the system—for example as a safeguard when other measures fail—or are expected to fail.

The PFC can be enabled or disabled on any port, regardless of it function: server facing port, uplink or Leaf-Spine interconnect. PFC can be enabled/disabled on any priority. The previously mentioned protocol may provide lossless operation on the interconnecting links. However, it may be beneficial to enable PFC on these links—for example as safe guard over all priorities. This may guarantee the buffer extension operation at a little loss of performance due to the HoL blocking nature of PFC.

PFC may be applied in relation to various priorities—such as but not limited to priorities associated with RoCE/NVMeoF traffic.

Figure 8:
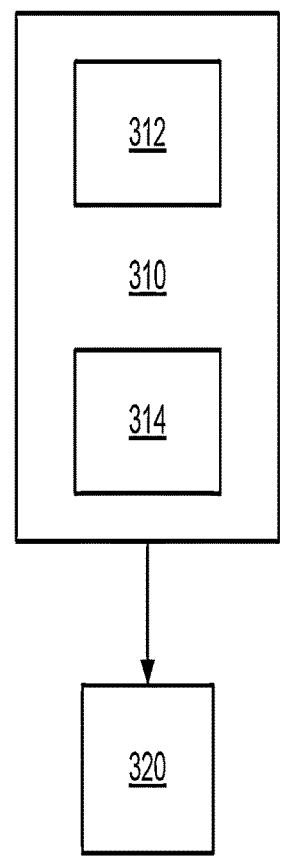
FIG. 8 is an example of a method.
Figure 9:
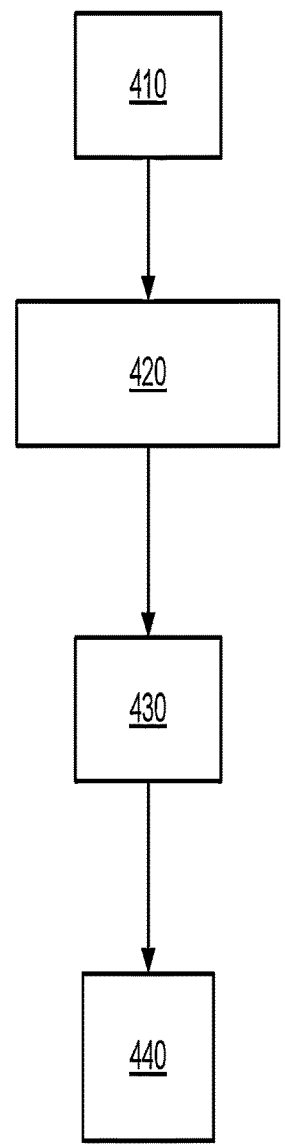
FIG. 9 is an example of a method.

FIG. 8 illustrates method 300.

Method 300 may be for managing traffic between servers.

Method 300 may start by step 310 of controlling, by controllers of a system, traffic between servers. The system may include (i) first tier switches that are coupled to the servers; (ii) second tier switches that are coupled to the first tier switches and to third tier switches; wherein each first tier switch may include first queues; wherein each second tier switch may include second queues.

Step 310 may include controlling a traffic between the first tier switches and the second tier switches—the traffic between the T1 and T2 switches is attributed to the traffic between the servers. The controlling is executed on, at least, a queue granularity.

Step 310 may include step 312 of controlling some first queues to provide buffer extension to some second queues.

Step 310 may include step 314 of controlling some second queues to provide buffer extension to some first queues.

Step 310 may include controlling, by at least one of the controllers, the traffic between the first tier switches and the second tier switches on a queue granularity and on at least one additional granularity that is coarser than the queue granularity. The at least one additional granularity may be a group of queues granularity, a link granularity, a switch granularity, and the like.

Step 310 may include at least one of the following:
a. Controlling, by at least one of the controllers, traffic from a source server to a destination server while enforcing a minimal hop approach.
b. Preventing traffic between servers coupled to a same first tier switch from reaching any second tier switch.
c. Preventing traffic between servers coupled to different first tier switches of a same pod from reaching any third tier switches.
d. Passing traffic between servers coupled to different pods through one or more third tier switches.
e. Controlling, by at least one of the controllers, traffic from a source server to a destination server, when the source server and the destination server are coupled to a same first tier switch, by conveying the traffic through a first tier switch and without sending the traffic to a second tier switch.
f. Controlling, by at least one of the controllers, traffic from a source server that is coupled to a first tier source switch to a destination server that is coupled to a first tier destination switch, through second buffer extension queues of certain second tier switch, and through a first queue of a destination first tier switch, when the source first tier switch and the destination first tier switch differ from each other but belong to the same pod of the multiple pods, by conveying the traffic through a first input queue of a source first tier switch.
g. Controlling, by at least one of the controllers, traffic from a source server that is coupled to a first tier source switch to a destination server that is coupled to a first tier destination switch, by conveying the traffic through a first queue of the source first tier switch, through a second buffer extension queue of certain second tier switch, towards a third tier switch, from another third tier switch, through another second tier switch and through a destination first tier switch.
h. Controlling, by at least one of the controllers, traffic between a certain first queue and certain second queues that provide buffer extension to the first queue by (a) monitoring a status of the certain queue, (b) detecting a potential congestion based on the rate of traffic and when a fullness level of the first queue exceeds a predefined threshold but is lower that a maximal fullness level, (c) sending a potential congestion alert, and (d) initiating a congestion prevention step related to the certain second queues. The detecting of the potential congestion, the generating of the potential congestion alert and the initiating of the congestion prevention is executed within less that a millisecond—for example below 100, 50, 30, 20 and even below 10 microseconds.
i. Controlling the traffic between the third tier switches and the second tier switches.

Step 310 may be followed by step 320 conveying the traffic according to the outcome of step 310.

FIG. 8 illustrates method 400.

Step 410 starts by monitoring a queue of a system. The queue belong to a certain tier of the system out of a first tier and a second tier. The queue is associated with multiple queues that provide the queue buffer extension. The multiple queue belong to another tier out of the first tier and the second tier.

Step 410 is followed by step 420 of detecting a potential congestion event related to the queue.

Step 420 is followed by step 430 of sending a potential congestion alert to the multiple queues or to one or more controllers that are related to the multiple queues.

Step 430 is followed by step 440 of responding to the potential congestion alert.

Step 440 may also include recovering from the reducing of the rate of traffic sent to the queue, the traffic shaping and even port blocking. The recovery may include auto recovery. The recovery may include increasing the rate at multiple iterations, applying different auto recovery processes by different rate shapers, and the like.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component. For example—any reference to a method as including a certain step should also cover the scenario in which the method does not include the certain component. Yet for another example—any reference to a system that is configured to perform a certain operation should also cover the scenario in which the system is not configured to perform the certain operation.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system.

It will be appreciated that for simplicity and clarity of illustration, elements shown in the figures have not necessarily been drawn to scale. For example, the dimensions of In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit that is illustrated in any of the figures and/or specification and/or the claims may be provided.

Any combination of steps, operations and/or methods illustrated in any of the figures and/or specification and/or the claims may be provided.

What is claimed is:

1. A non-transitory computer readable medium that stores instructions that once executed by a computerized system will cause the computerized system to execute the steps of:
controlling, by controllers of the computerized system, traffic between servers, wherein the computerized system comprises (i) first tier switches that are coupled to the servers; (ii) second tier switches that are coupled to the first tier switches and to third tier switches; wherein each first tier switch comprises first queues; wherein each second tier switch comprises second queues; and
wherein the controlling of the traffic comprises:
controlling a traffic between the first tier switches and the second tier switches that is attributed to the traffic between the servers, (a) on, at least, a queue granularity; (b) while controlling some first queues to provide buffer extension to some second queues, and (c) while controlling some second queues to provide buffer extension to some first queues; wherein the first tier switches and the second tier switches are positioned in multiple pods;
preventing traffic between servers coupled to a same first tier switch from reaching any second tier switch;
preventing traffic between servers coupled to different first tier switches of a same pod from reaching any third tier switches, and passing traffic between servers coupled to different pods through one or more third tier switches.

2. The non-transitory computer readable medium according to claim 1 that stores instructions for controlling, by at least one of the controllers, traffic from a source server to a destination server, when the source server and the destination server are coupled to a same first tier switch, by conveying the traffic through a first tier switch and without sending the traffic to a second tier switch.

3. The non-transitory computer readable medium according to claim 1 that stores instructions for controlling, by at least one of the controllers, traffic from a source server that is coupled to a first tier source switch to a destination server that is coupled to a first tier destination switch, through second buffer extension queues of certain second tier switch, and through a first queue of a destination first tier switch, when the source first tier switch and the destination first tier switch differ from each other but belong to the same pod of the multiple pods, by conveying the traffic through a first input queue of a source first tier switch.

4. The non-transitory computer readable medium according to claim 1 that stores instructions for controlling, by at least one of the controllers, traffic from a source server that is coupled to a first tier source switch to a destination server that is coupled to a first tier destination switch, by conveying the traffic through a first queue of the source first tier switch, through a second buffer extension queue of certain second tier switch, towards a third tier switch, from another third tier switch, through another second tier switch and through a destination first tier switch.

5. The non-transitory computer readable medium according to claim 1 that stores instructions for controlling, by at least one of the controllers, traffic between a certain first queue and certain second queues that provide buffer extension to the first queue by (a) monitoring a status of the certain queue, (2) detecting a potential congestion when a fullness level of the first queue exceeds a predefined threshold but is lower that a maximal fullness level, (c) sending a potential congestion alert, and (d) initiating a congestion prevention step related to the certain second queues.

* * * * *